UNITED STATES PATENT OFFICE.

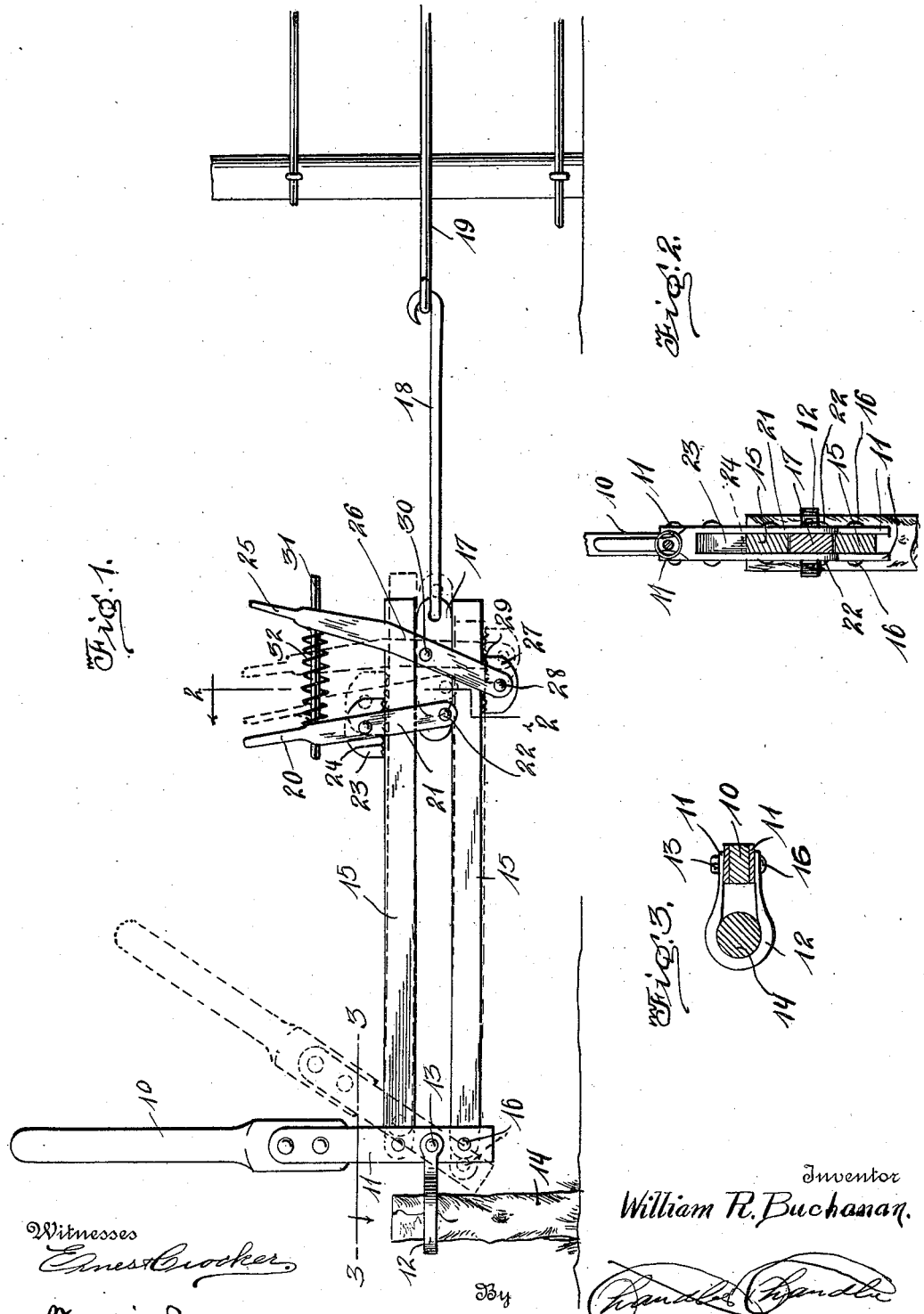

WILLIAM R. BUCHANAN, OF SHETLERVILLE, ILLINOIS.

WIRE-STRETCHER.

975,324.

Specification of Letters Patent.

Patented Nov. 8, 1910.

Application filed July 16, 1910. Serial No. 572,378.

*To all whom it may concern:*

Be it known that I, WILLIAM R. BUCHANAN, a citizen of the United States, residing at Shetlerville, in the county of Hardin, State of Illinois, have invented certain new and useful Improvements in Wire-Stretchers; and I do hereby declare the following to be a full, clear, and exact description of the invention, such as will enable others skilled in the art to which it appertains to make and use the same.

This invention relates to wire stretchers, and has for its object to provide a strong, durable and effective wire stretcher that will have novel stretching jaws, these jaws stretching the wire during both the forward and rearward stroke of the operating lever.

In the accompanying drawing forming part of this specification:—Figure 1 is a side elevation of my improved wire stretcher shown in the middle of its stroke, and dotted in initial position of its stroke. Fig. 2 is a cross sectional view taken on the line 2—2, Fig. 1. Fig. 3 is a fragmentary sectional view taken on the line 3—3, Fig. 1.

Referring now to the drawing, the reference character 10 designates a handle lever formed from a straight bar of wood or other suitable material and equipped adjacent one end with a pair of spaced parallel strips 11, to the outer faces of which the extremities of an anchoring loop 12 is connected by means of a single pivot bolt 13. This loop is slipped over a post 14 when it is desired to set up the device for stretching wire fencing.

Pivoted at their inner ends to the handle lever on opposite sides of the fulcrum loop is a pair of arms 15, these arms being formed rectangular in contour and cross section and being without mutilation of any character other than by openings which receive pivot bolts 16 that secure the arms to the handle lever. Mounted between the arms is a slide 17 which is equipped at one end with an elongated hook 18, over the bill of which the fence wire 19 to be stretched is secured in any preferred manner. This slide is rectangular in cross section and its side faces are flush with the side faces of the arms 15.

The stretching jaws are pivotally mounted on the slide and each straddles one of the arms 15. One of the jaws comprises a lever 20 having a bifurcated extremity, the branches 21 of which straddle the uppermost arm 15 and are pivotally connected adjacent their extremities to the slide by means of a pivot bolt 22, this bolt being arranged adjacent that longitudinal edge of the slide most remote from the uppermost arm 15.

Pivotally mounted between the branches of the lever is a dog 23, this dog being preferably formed from a semicircular disk, the straight edge of which is serrated as shown at 24, and is adapted to bind tightly against the adjacent edge of the uppermost bar when the lever is rocked to a certain position. The dog when in contact with the edge of the arm cams the arm into engagement with the slide so that the arm is tightly held between the serrated face of the dog and opposed face of the slide. When the parts are in this position, the slide will be moved rearwardly with the arm when the latter is moved rearwardly through the instrumentality of the operating lever 10.

The mating jaw comprises a lever 25 which is arranged upon the same side of the uppermost arm of the device as the above described jaw, and is provided with a bifurcated extremity, the branches 26 of which straddle both arms and the slide interposed therebetween, and further extends a slight distance beyond the lowermost arm. A dog 27 which is semicircular in contour is pivoted as shown at 28 between the branches of the lever and is provided with a serrated flat face 29 which binds against the lower edge of the lowermost arm 15 when the jaw is in a certain position. The lever 25 is pivotally connected to the slide by means of a pivot bolt 30, this bolt being passed transversely through the branches of the lever and through the slide adjacent the uppermost longitudinal edge as shown. As above stated, when the lever is in a certain position, which position is shown to be inclined to the arms in the drawings, the serrated face of the dog 27 will be forced into engagement with the opposed edge of the lowermost arm and this arm cammed thereby into engagement with the lowermost longitudinal edge of the slide and when in this position, the slide will be locked to the arm and will be moved simultaneously therewith.

Fitted in suitable openings in the levers 20 and 25 is a pin 31, this pin being arranged approximately parallel with the bar, and upon this pin is seated a helical spring 32, the ends of which bear against the levers, this spring operating to normally hold the free ends of the levers spaced apart.

By referring to Fig. 1 it will be seen, when the handle lever is pulled rearwardly from the position shown in dotted lines that the lowermost arm will be advanced between the branches of the lever 25 and it will tend to push the dog 27 in the direction of the movement of the arm and since as the lever approaches nearly to a perpendicular position relatively to the arm, the dog will be correspondingly spaced from the arm, it is evident that the lowermost arm will slide freely over the serrated face of the dog. It will further be observed, as the handle lever is pulled rearwardly that the arm 15 will be pulled rearwardly and will tend to cause the lever 20 to assume a more obliquely inclined position relatively to the arm, which position of the lever causes the dog 23 to bind against the arm and cam the latter into engagement with the slide as above stated. When the parts are locked in this position any movement of the handle lever rearwardly will cause the slide to be advanced rearwardly simultaneously with the uppermost arm 15 and stretch the wire 19. When the handle lever has reached the rearmost limit of its stroke and has begun to be advanced forwardly, the above operation is reversed, namely, the uppermost arm 15 slides freely beneath the opposed faces of the dog 23 and the slide, while the lowermost arm is cammed into engagement with the slide by the dog 27. The bar 15 being held between the dog 27 and the slide will during the forward stroke of the lever be advanced rearwardly and carry the slide rearwardly or in the same direction as it was carried when the handle lever was rocked rearwardly as above described. Thus the wire is stretched continuously, that is to say, is advanced during both the forward and rearward strokes of the handle lever.

It will be noted by referring to Fig. 1 that the upper ends of the levers 20 and 25 are reduced and form grips which the operator may manually press toward each other in releasing the jaws after the wire has been stretched to the desired extent. These grips it will be noted extend from the same side of the arm 15 as the handle lever 10 so as to be within convenient reach of the operator.

What is claimed is: —

1. A wire stretcher comprising a handle lever, a fulcrum adjacent one end of the lever, a pair of lateral arms pivotally connected to the lever on opposite sides of said fulcrum, a slide mounted between said arms, levers pivotally connected to said slide adjacent the opposed longitudinal edges thereof and extending transversely of said arms, pivoted dogs carried by said levers and bearing on the outer sides of said arms, and operating to alternately wedge said arms against said slide, and tension means operating to normally hold said jaws in operative position.

2. A wire stretcher comprising a handle lever, a fulcrum adjacent one end of the lever, a pair of lateral arms pivotally connected to the lever on opposite sides of said fulcrum, a slide mounted between said arms, levers arranged upon the same side of said arms and pivotally connected to said slide, one of said levers being terminally connected to said slide and the other of said levers being connected at its intermediate portion to said slide, dogs mounted on said levers and engaging the outer sides of said arms, said dogs being adapted to lock said arms alternately in contact with said slide whereby the slide is advanced in one direction between said arms during the movement of the handle lever in both directions, and a spring mounted between the free ends of said levers and operating to hold said jaws in operative position.

In testimony whereof, I affix my signature, in presence of two witnesses.

WILLIAM R. BUCHANAN.

Witnesses:
    THOMAS WALKER,
    KATIE COWSERT.